United States Patent [19]

Fey et al.

[11] Patent Number: 4,571,259
[45] Date of Patent: Feb. 18, 1986

[54] APPARATUS AND PROCESS FOR REDUCTION OF METAL OXIDES

[75] Inventors: Maurice G. Fey, Plum Boro, Pa.; John H. Fatum, Brecksville, Ohio; Thomas N. Meyer, Murrysville, Pa.

[73] Assignee: Westinghouse Electric Corp., Pittsburgh, Pa.

[21] Appl. No.: 692,810

[22] Filed: Jan. 18, 1985

[51] Int. Cl.⁴ .......................... C22B 4/00; C22B 4/08
[52] U.S. Cl. ........................................ 75/10 R; 75/11; 266/148; 373/22; 373/56
[58] Field of Search .................. 373/22, 56; 266/148; 75/10 R, 11

[56] References Cited

U.S. PATENT DOCUMENTS

4,019,895  4/1977  Santen ..................................... 75/11

Primary Examiner—Melvyn J. Andrews
Attorney, Agent, or Firm—John Victor Pezdek

[57] ABSTRACT

An apparatus and process for the reduction in a plasma stream of a feed material including a comminuted metal oxide, a slag former and a reductant utilizing an enclosed horizontal reactor having a reduction chamber and a filter chamber therein separated by an either common partition having a plurality of holes therethrough or a refractory lined passageway. Coke filter media in the filter chamber act to filter out entrained molten metal contained in the plasma stream with the partition or passageway preventing entry of the coke from the filter chamber into the metal bath contained in the reduction chamber thereby limiting the amount of carbon entering the metal produced. Unreduced metal oxide is provided in the slag layer of the metal bath to maintain the stoichiometric ratio between the metal and reductant in the reduction chamber. In alternate embodiments of the invention, the reactor is provided with a sloped floor or with a rocker mechanism to control the residence time of the metal with the coke thus limiting the amount of carbon entering the metal product. The exhausted plasma stream can be recycled for preheating and prereducing the incoming feed material.

57 Claims, 4 Drawing Figures

FIG. 3

APPARATUS AND PROCESS FOR REDUCTION OF METAL OXIDES

BACKGROUND OF THE INVENTION

Field of the Invention

In general the invention relates to apparatuses and processes used for the reduction of metal oxides and in particular to apparatuses and processes which employ electric plasma torches to supply the necessary thermal energy for the reduction reaction.

The production of iron and ferroalloys by carbothermic reduction is generally accomplished using blast furnaces, direct-reduction shaft furnaces, or electric smelting furnaces. The blast furnace traditionally used for iron making consists of a downwardly moving coke/iron ore bed within a vertical shaft. Preheated air is admitted at the bottom of the shaft traveling countercurrent to the bed while reacting with the coke to provide both carbon monoxide for reductant and the required heat to satisfy the process energy requirements. The blast furnace is very well optimized in terms of scale economics, energy efficiency and material yield. It has, however, several inherent shortcomings. These include high coke consumption per ton of iron produced; agglomeration of the ore prior to processing; economic operation only at very large capacities, e.g., over 2 million tons/year; the product iron is fully saturated with carbon (i.e., carbon content is greater than 4%); high gas flow rates and resultant pollution control equipment for the cleaning of the gas; and high capital costs. The cost of iron production using state-of-the-art blast furnaces is on the order of $200/ton of iron produced.

As an altenative to the blast furnace, direct reduction and direct electrical smelting techniques evolved. The former produces metallized pellets suitable for melting in an electric arc furnace. Prior to direct reduction, iron oxide is pelletized then indurated by firing at a temperature of 2400°–2500° F. The pelletizing process adds about $30–$40 in costs per ton of iron due to the large amount of energy required for firing of the pellets. The pellets are fed into the top of a direct reduction shaft furnace where they move slowly downward against the upward flow of reducing gases having temperatures of about 850° C. In the pellets, metallization levels of 92–94% are typically achieved under industrial operating conditions. Upon leaving the reduction shaft, the reduction gas is regenerated and recycled back to the reduction furnace. The pellets are then fed into the electric arc furnace wherein an electric arc is used for melting and alloying of the pellets into steel products. With this system lower capital costs are achieved. However, the rapid escalation of the price of natural gas, which is used as the source of the reducing gases in the reduction furnace, has made this approach somewhat uneconomical.

Development of a process for cost competitive iron making should include the following features. The source of iron units should be iron ore concentrate, not pellets or sinter. The principal carbon source for the reduction reaction should be coal rather than the more costly coke, oil, or natural gas. The product should also be molten iron directly useful for steel making or capable of shipment without further treatment to prevent reoxidation. Further, the carbon content should be controllable at levels in the range of 0.1 to 4.0%, thus the product could be used as pig iron or could be directly useful for steel making. Lastly, the energy requirement should be minimized.

Processes having some of these features have been patented in various configurations. Westinghouse developed a system for the plasma smelting of prereduced ore, incorporating fluid beds for preheating and prereduction of ore concentrate using the off gases leaving the plasma reactor. This process is described in U.S. Pat. No. 4,061,492 entitled "Method of Ore Reduction with an Arc Heater" and issued Dec. 6, 1977 and assigned to the assignee of the present invention. The Boliden process described in U.S. Pat. No. 3,365,185 entitled "Production of Metals from Pulverulent Materials by Flash Melting in an Electrically Heated Furnace" and issued Jan. 23, 1968 and U.S. Pat. No. 3,563,726 entitled "Production of Metal from Pulverent Material by Flash Smelting in a Vortex" and issued Feb. 16, 1971 utilizes the flash smelting of ore in an electrically heated furnace. There, oxygen, pulverized coal, and iron ore concentrate are combined in a flash smelter to provide a molten partially reduced matte which is reduced to iron after forming a slag layer in a submerged arc furnace located below the smelter. Off gases from the smelter are burned and recuperated in a steam generator to provide the arc furnace power. The ASEA process trade-named ELRED employs an electric arc furnace for the final smelting of the iron ore in a series of countercurrent fluid beds for the prereduction of the incoming ore concentrate by contact with the hot reducing gases leaving the furnace. A further process described in U.S. Pat. No. 4,072,504 entitled "Method of Producing Metal from Metal Oxides" and issued Feb. 7, 1978, employs electric arc or plasma torches to fire the bottom of a coke filled shaft furnace. Prereduced iron ore concentrate and pulverized coal are injected into the plasma-heated gas stream at the bottom of the coke-filled shaft furnace where smelting is accomplished. The gases leaving the furnace are used to preheat and prereduce the iron ore in countercurrent fluid beds similar to the Westinghouse and ASEA systems In U.S. Pat. No. 4,425,659 entitled "Metal Oxide Reduction Furnace" and issued Jan. 10, 1984, an electrode mounted through the side of the lower portion of the furnace generates an arc that burns a cavity in the coke column contained therein with a stream of metal oxide particles mixed with a reducing agent is injected into the cavity where the reduction reaction occurs. The coke column extending directly above the reaction zone filters contaminants such as liquid hydrocarbon or coal from the reaction gases rising through the coke column. The coke column also serves to shield the reactor walls from the arc flare occurring at the lower portion of the reactor. In U.S. Pat. No. 3,834,895 entitled "Method of Reclaiming Iron from Ferrous Dust" and issued Sept. 19, 1974 iron bearing particulate waste is introduced into a plasma-arc furnace with the molten iron being collected at the bottom for discharge into ingots or directly into a steel making furnace.

All of the cited art teach the principles of smelting combined with prereduction and thus all feature the same energy requirements of about 3 to 4 KGcal/ton of product iron. However, all have the same practical shortcoming when considered for use with U.S. Mesabi taconite iron ore or other metallic ores of very small particle size (10 microns to 1000 microns). Elutriation and carryover from the fluid beds or flash smelter reactor and the resultant loss of ore from the system occur.

Although in the first two patents cited previously, the coke bed is used both for reaction surface as well as recovery of finely divided iron droplets. They both have the disadvantage of carbon saturating the molten iron as it contacts the matrix of coke at the bottom of the shaft. The carbon saturation is the result of a long contact time between the iron pool or bath and the coke matrix that occurs between tapping of the melt.

An apparatus and process in which the contact time of the metal with the coke matrix can be minimized would therefore be advantageous. Further, the ability to control the time of contact of the metal with the coke and thus be able to control the percentage of carbon dissolving into the molten metal would also be advantageous. Further, an apparatus and process useful for the direct reduction of one having a very small particle size and allowing control of the carbon content thereof would also be beneficial.

SUMMARY OF THE INVENTION

The subject of the invention is a process and apparatus for the direct reduction of a feed material that includes a reductant, a slag former and a comminuted metal oxide in a plasma heated stream wherein the metal produced forms a metal bath in the apparatus. The apparatus comprises an enclosed or horizontal reactor having a reduction chamber for containing the metal bath and an adjacent substantially coke-filled filter chamber being drainable into the reduction chamber. In alternate embodiments the reduction chamber and filter chamber are separated by either refractory lined passageway or a common partition having a plurality of openings therethrough with the lower portion of the partition damming the metal bath in the reduction chamber. An electric arc plasma torch is used for heating a reducing gas to form a plasma heated stream. The plasma torch is positioned proximate the top of the reactor and in communication with the reduction chamber allowing for the introduction of the plasma stream into the reduction chamber. The plasma heated stream is directed substantially towards the floor of the reduction chamber. A feeder is provided for introducing the feed material into the plasma heated stream such that substantially all of the metal and slag produced separates from the plasma stream and collects in the lower portion of the reduction chamber—the molten metal forming the metal bath. The plasma heated stream impinges on the surface of the metal bath allowing for the recovery of some of the excess heat contained in the plasma stream as well as the heating and mixing of the metal bath. A slag layer on the metal bath contains unreduced metallic oxide in order to keep the ratio of metallic oxide to reductant at the stoichiometric value. A tapping means is provided for the removal of the metal from the metal bath to substantially eliminate overflow of the metal bath into the filter chamber either via the openings in the partition or the refractory lined passageway. An exhaust means is provided in communication with the filter chamber for removing the plasma heated stream from the reduction chamber by drawing it through a portion of the openings in the partition or the passageway. The coke in the filter chamber serves as a filter media that removes the molten metal remaining in the plasma heated stream with the recovered metal draining from the filter chamber through either the passageway or a portion of the openings in the partition into the metal bath for recovery. The partition and passageway are used to prevent the entry of the coke from the filter chamber into the reduction chamber thereby preventing carbon saturation of the metal bath. The exhaust gas can be recycled for prereduction and/or preheating of the incoming feed material.

Alternate embodiments of the apparatus include sloping of the floor of the filter chamber or the use of a rocker mechanism to encourage the draining of the recovered metal from the filter chamber into the reduction chamber. By changing the slope of the floor or the angle at which the reactor is tilted, the residence time of the metal in the filter chamber can be controlled in order to limit the amount of coke dissolving into the recovered metal. Thus, the reactor of the present invention allows use of the fine particle size metal oxides while limiting the amount of carbon entry into the metal produced therein. Tubular water-cooled refractory-lined spacers can also be provided intermediate the plasma torch and reactor for increasing the contact time between the feed material and the plasma heated stream prior to their entry into the reduction chamber.

BRIEF DESCRIPTION OF THE DRAWINGS

For a better understanding of the invention reference may be made to the embodiments exemplary of the invention shown in the accompanying drawings wherein.

DETAILED DESCRIPTION

Figure 1:
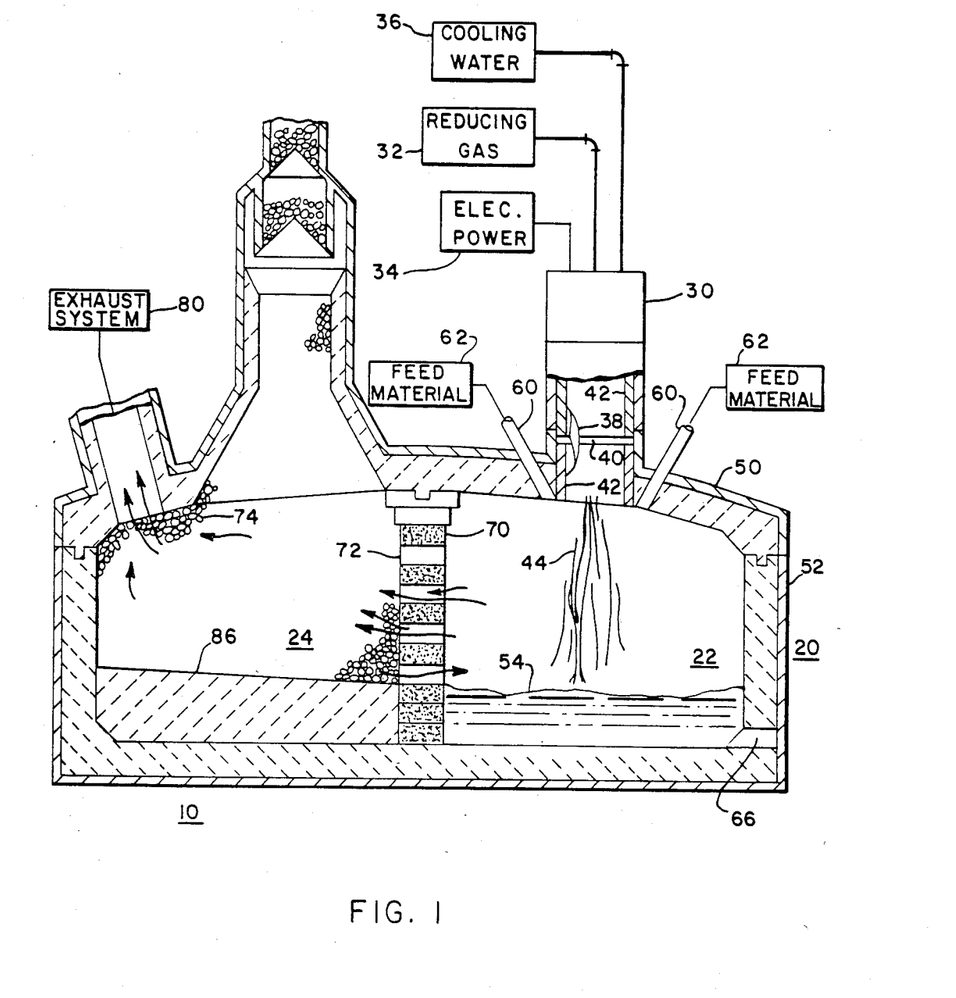
FIG. 1 is a cross-sectional view of the apparatus embodying the present invention.

As shown in FIG. 1 the apparatus 10 comprises a refractory lined reactor 20 which is divided into two chambers—a reduction chamber 22 and a filter chamber 24. One or more electric arc plasma torches 30, also known as arc heaters, are located proximate the roof 32 of the reduction chamber 22 and communicate therewith. The plasma torch 30 is connected to a reducing gas supply 32, a source of electric power 34 and a supply of cooling water 36. In the plasma torch, an electric arc 38 is struck across a small axial gap 40 between two hollow cylindrical electrodes 42. The gas, preferably carbon monoxide, synthesis gas ($CO/H_2$ mixtures), or recycled exhaust gas, is introduced into the plasma torch 30 by one or more flow paths including the axial gap 40 and is heated by the arc 38 forming a high temperature plasma heated stream 44. Preferably the flow rate of the gas through the plasma torch 30 is maintained to prevent carryover of the electric arc 38 into the reduction chamber 22. Striking of the refractory lining of the reduction chamber by the electric arc can decrease the operating life of the lining. Typical plasma stream temperatures are in the range from about 3000° C. to about 7000° C. Preferably, the plasma torch 30 is located on the roof 50 or side walls 52 of the reactor 20 and oriented so that the plasma heated stream 44 created therein will impinge on the surface of the metal bath 54 that is collected at the bottom of the reduction chamber 22.

A feed mechanism 60 is provided to introduce the feed material 62 which includes a comminuted metal oxide, slag formers, and a reductant, into the plasma heated stream 44. Preferably, this feed mechanism is a dense phase flow system, i.e., one where there are about 10 or more pounds of particulate to each pound of carrier gas. In contrast to dilute phase systems that use lower particle to gas ratios, the dense phase system decreases the total volume of carrier gas passing through the apparatus. Other types of material transport systems can also be used.

In the reactor the comminuted metal oxide is heated by the plasma heated stream 44, in the presence of the reductant, melted, and reduced to the metallic state with the metal and slag being collected in the reduction chamber 22. It is recognized that the reduction reaction may not be completed in the plasma heated stream 44 thus, additional residence time is provided by the molten metal bath 54. The impingement of the plasma heated stream 44 on the surface of the metal bath 54 promotes both heat transfer to the metal bath 54 and turbulence to optimize mixing among the unreacted species. This encourages complete reaction and maximization of metallic yield. A taphole 66 is used for the removal of the metal collected in the metal bath 54 to substantially eliminate overflow thereof into the filter chamber 24. Manual or automatic tapping apparatus can be used to maintain the level of the metal bath 54.

The filter chamber 24 is separated from the reduction chamber 22 by a partition 70 having a plurality of openings 72 therethrough. The partition can be thermally stabilized by providing appropriate passageways therein for cooling water or other cooling fluids. The openings permit 72 the flow of the plasma heated stream 44 into the filter chamber 24. Filled with a filter media such as metallurgical coke 74, the filter chamber 24 is in communication with an exhaust system 80 including elements such as heater exchanges, fans and gas cleaning equipment. The coke 74 is introduced into the filter chamber 24 by conventional means such as a double lock hopper or a double-bell system 84 such as those used with blast furnaces.

In operation the exhaust system 80 is used to draw the plasma heated stream 44 through the openings 72 in the partition and through the coke filter media 74. In the coke, fine droplets of molten metal and slag entrained in the plasma heated stream 44 are removed. This produces the benefits of reducing the amount of pollutants entering the gas cleaning equipment that is normally provided with such exhaust apparatus and at the same time maximizing the yield of the molten metal product. The molten metal which is recovered in the coke filter 74 drains from the filter chamber 24 through the partition 70 into the molten bath 54. Adjustment in the rate at which the recovered metal drains from the filter chamber 24 is the means used to control the dissolution of the carbon present in the filter media into the metal recovered in the filter chamber 24. Various means can be used to control the rate at which the recovered metal drains into the reduction chamber 22. As shown in FIG. 1 the slope of the floor 86 of the filter chamber 24 can be increased or decreased to control the rate at which the recovered metal drains into the metal bath 54 through a portion of the openings 72 in the partition. In lieu of or in combination with the sloped floor 86, a system of drainage channels or conduits (not shown) can be used to direct the recovered metal into the metal bath 54. Preferably, the apparatus shown in FIG. 1 is used for the production of low carbon content metals, that is, metals having a carbon content of less than 1%.

Normally there is unreacted carbon present in the reductant that is introduced into the reactor. This unused carbon will not have the opportunity to react with the metal oxide prior to impingement on the metal bath 54 and will enter the metal bath 54 resulting in carbon saturation. To avoid carbon saturation from this source it is necessary that the ratio between the metal oxide and the carbon be maintained approximately at the stoichiometric ratio. To this end sufficient metal oxide is fed into the reactor so that some will be found in the slag formed on the surface of the metal bath 54. By maintaining a small amount of metal oxide in the range from about 3% to about 15% by weight in the slag collected on top of the metal bath 54, the unreacted carbon will have the opportunity to react with the metal oxide in the slag and thus be unavailable to enter the metal bath. Thus control of the carbon content of the metal is achieved. Periodic or continuous analysis of the metal bath to determine carbon content and of the slag to determine metal oxide content with corresponding adjustments to the amount of the metal oxide being fed into the reactor ensures that the desired carbon content is maintained.

Figure 2A:
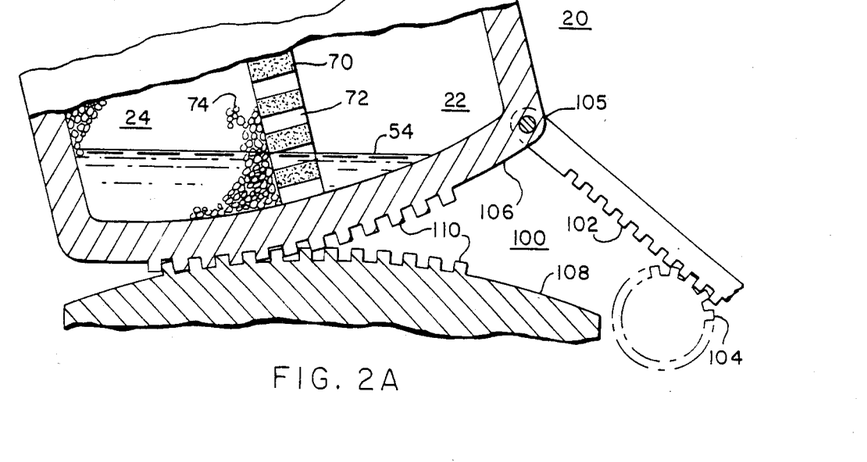
FIGS. 2A and 2B are partial sectional illustrations of an alternate embodiment of the invention utilizing a reactor rocking mechanism.
Figure 2B:
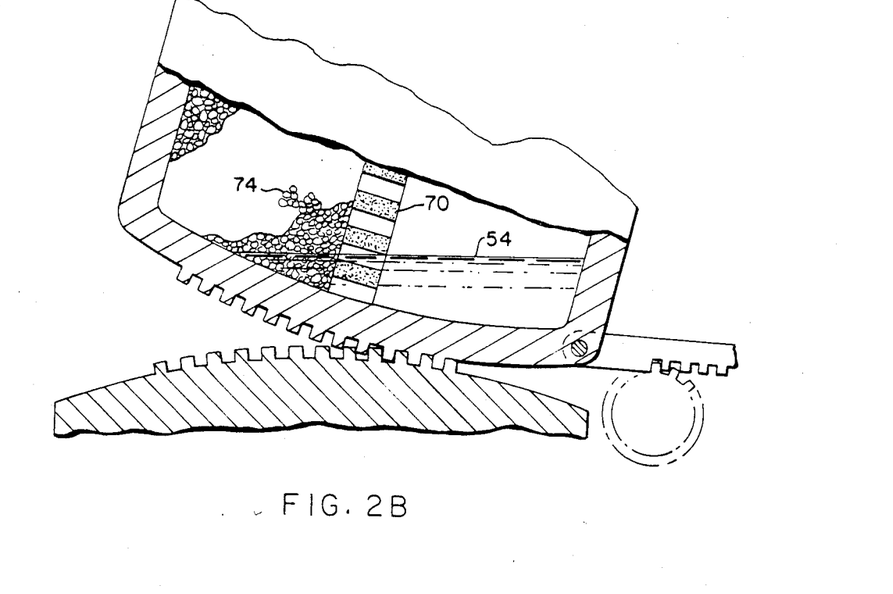

More variability in the percentage of carbon found in the metal produced is provided by the alternate embodiment of the invention shown in FIGS. 2A and 2B. The reactor is constructed substantially the same as that previously described. Accordingly, similar elements will carry the same numeric designation previously used. As shown there the rocker mechanism 100 includes a rack 102 and a pinion 104 with the rack 102 rotatively connected to the reactor 20 as shown at 105. The pinion 104 is connected to a source of motive power such as a motor. The reactor 20 is provided with a curved bottom portion 106 to facilitate the desired tilting of the reactor 20. An oppositely curved rocker base 108 on which bottom portion 106 of the reactor 20 rests can also be used to facilitate tilting. A plurality of teeth 110 can be provided on the bottom portion 106 and the rocker base 108. These teeth will mesh during the tilting of the reactor 20. Other devices and structures such as trunnion mounts or hydraulic rockers can be used to tilt the reactor. The rocker mechanism shown is for the purposes of illustration only and should not be considered as limiting the invention. The rocker mechanism 100 is used to tilt the reactor 20 such that the metal is collected in either the reduction chamber 22 or the filter chamber. Where higher carbon content is required, the reactor 20 is tilted as in FIG. 2A such that the metal bath 54 will collect in the cokefilled filter chamber 24. Conversely, where a lower carbon content product is desired, the reactor is tilted as in FIG. 2B such that the metal will collect in the reduction chamber 22. Again the partition 70 substantially prevents the entry of the coke 74 into the reduction chamber 22. The residence time of the metal with the coke is controlled by the amount of tilt as well as the direction of tilt. It will be appreciated that with this arrangement the various connections to the reactor are accomplished via moveable duct work, and flexible cabling and piping.

Figure 3:
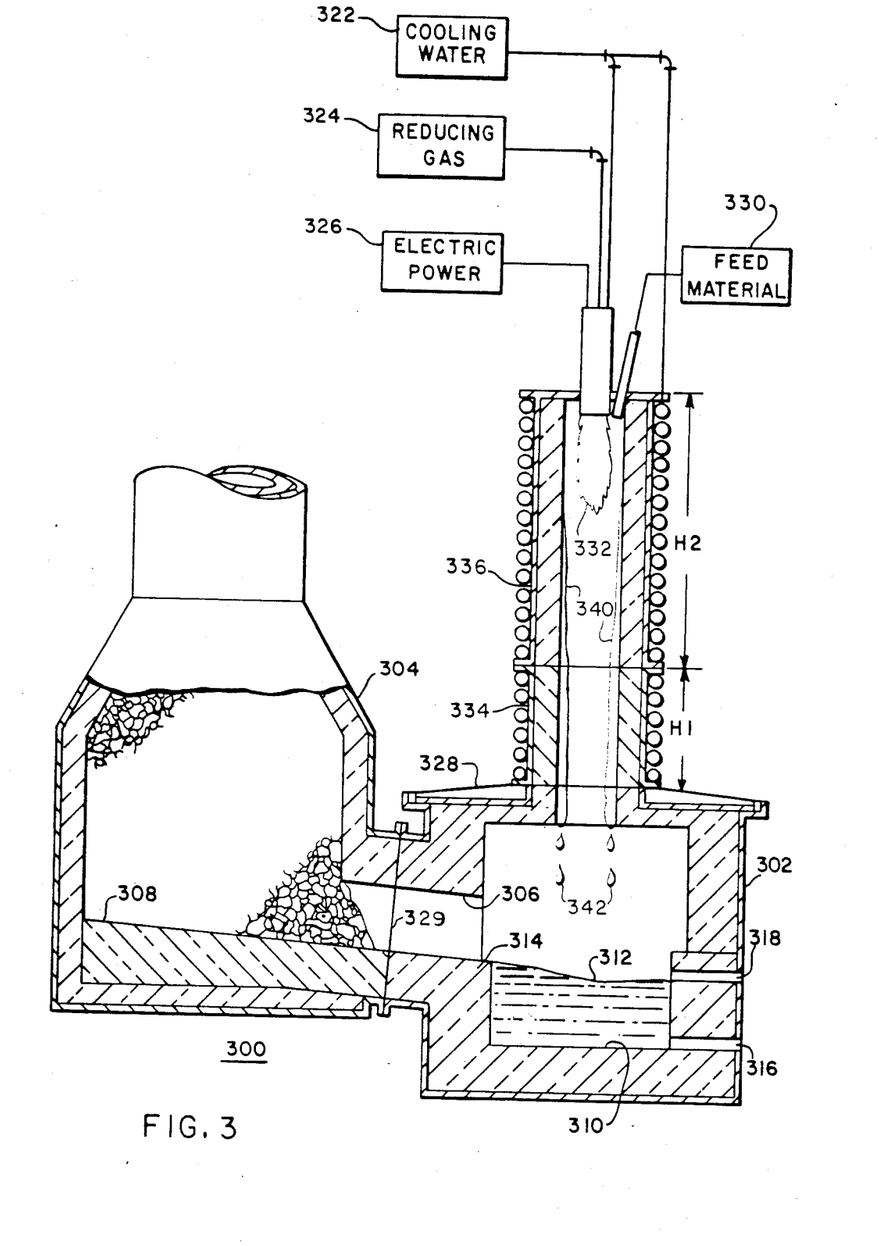
FIG. 3 is a sectional illustration of an alternate embodiment of the invention using a refractory lined passageway.

In FIG. 3, an alternate embodiment of the invention utilizing a refractory line passageway between the reduction chamber and the filter chamber is illustrated. There the enclosed horizontal reactor 300 includes a reduction chamber 302 for containing the melt in communication with the filter chamber 304 via a refractory lined communicating passageway 306. The floor 308 of the filter chamber 304 is sloped and elevated above the floor 310 of the reduction chamber 302 giving the appearance of a step when viewed in cross section. The melt 312 is contained in the well 314 or lower portion of the reduction chamber 302. In communication with the well 314 a tap hole 316 is provided for drawing out the molten metal collected. A slag port 318 for removing the slag from the surface of the melt 312 can also be provided. A non-transferred electric arc plasma torch 320 having a cooling water supply 322, reducing gas supply 324, and an electric power supply 326 is mounted on the top or roof 328 of the reduction chamber 302. A feed material supply line 330 is provided adjacent the outlet of the arc heater 320 for feeding pulverulent material into the plasma heated stream 332 produced by the arc heater 320. Tubular refractory lined water cooled spacers 332 and 334 having heights H1 and H2, respectively, can be mounted intermediate the plasma torch 320 and and the top 328 of the reduction chamber 302. The filter chamber 304 is filled with particulated coke 329 that serves as a filter media. The coke 329 will enter into the passageway 306 in relation to its angle of repose. Accordingly, the length of the passageway 306 is made long enough so that the coke filter media 329 can rest along its angle of repose without spilling into the reduction chamber 302. The coke supply and exhaust system are substantially the same as described previously and are not shown in FIG. 3.

In operation the plasma heated stream 332 is drawn from the reduction chamber 302 through the passageway 306 and is filtered by the coke 329 that removes the entrained metal and slag which then drains along the sloped bottom 308 of the filter chamber 304 back into the well 314 of the reduction chamber 302. The use of the passageway 306 facilitates construction of the reactor as well as providing a larger opening for the withdrawal of the plasma stream from the reduction chamber. The spacers 334 and 336 are used to vary the distance of the plasma torch 320 above the melt 312 in four discrete increments: directly on top the reactor, the distance H1, the distance H2, or the distance representing the sum of H1 and H2. This provides additional contact time between the feed material and the plasma heated stream prior to their entry into the reduction chamber allowing for better heat transfer between the feed material 330 and the plasma heated stream 332. As the feed material 330 falls through the spacers, it is heated by the plasma heated stream 332 and deposits on the cooler inner surface 338 of the spacers forming a rolling or falling film 340 of molten material. The film 340 thickens as it descends along the inner surfaces 338 of the spacers and falls off in droplets 342 into the reduction chamber 302. This arrangement is more efficient for transferring the heat necessary for the reduction reactions than the direct impingement of the plasma heated stream on the surface of the melt 312. The spacers can also be used with the reactors illustrated in FIGS. 1 and 2.

In a further embodiment of the invention (not shown) the plasma heated gas stream which is withdrawn from the filter chamber can be used for the preheating and prereduction of the raw metallic oxides being fed into the apparatus. This can be done using a fluidized bed or other type of gas-solid contacting means such as a rotary kiln or multiple hearth. The use of preheating and prereduction reduces the thermal output required of the electric arc heater and, in turn, reduces the amount of electricity consumed during operation.

The metal oxides reduced in the reactor may be selected from the group consisting of iron oxide, chrome oxide, silicon oxide, manganese oxide, vanadium oxide, nickel oxide or mixtures thereof. Similarly, the reductant may be selected from the group consisting of pulverized coal, peat, coke breeze, atomized fuel oil or a gaseous hydrocarbon such as natural gas, propane, methane or butane. Preferably, the metal oxides and the solid reductants have a size in the range from about 10 microns to about 1000 microns.

Other embodiments of the invention will be apparent to those skilled in the art from a consideration of the specification or practice of the invention disclosed herein. It is intended that the specification be considered as exemplary only with the true scope and spirit of the invention being indicated by the following claims.

We claim:

1. An apparatus for the direct reduction of a feed material including a reductant, a slag former, and a comminuted metal oxide in a plasma heated stream wherein the metal produced forms a metal bath therein, comprising:

enclosed horizontal reactor means having a reduction chamber for containing the metal bath and an adjacent filter chamber in communication with and drainable into the reduction chamber;

non-transferred electric arc plasma torch means for heating a reducing gas to form heated plasma heated stream, the plasma torch means positioned approximate the top of the reactor means and in communication with the reduction chamber allowing for the introduction of the plasma heated stream into the reduction chamber such that the plasma heated stream is directed substantially toward the floor of the reduction chamber;

feeding means for introducing the feed material into the plasma heated stream such that a majority of the metal and slag produced separates from the plasma heated stream and collects in the lower portion of the reduction chamber forming the metal bath having a slag layer on the surface thereof with the plasma heated stream impinging on the metal bath thereby heating and mixing the metal bath;

tapping means for the removing of the metal from the metal bath to substantially eliminate overflow of the metal bath into the filter chamber;

filter means substantially filling the filter chamber for filtering the plasma heated stream, the filter means comprising particulated coke; and exhaust means in communication with the filter chamber for removing the plasma heated stream from the reactor means by drawing the plasma heated stream from the reduction chamber into the filter chamber and through the filtering means whereby the filtering means removes substantially all of the molten metal remaining in the plasma heated stream with the recovered metal and slag draining from the filter chamber into the metal bath of the reduction chamber for recovery, the separation between the filter chamber and the reduction preventing the entry of the coke of the filter means into the reduction chamber thereby preventing carbon saturation of the metal bath by the filtering means.

2. The apparatus of claim 1 wherein the feed means includes a carrier gas for transporting and feeding the feed material into the plasma heated stream.

3. The apparatus of claim 2 wherein the carrier gas and the reducing gas are selected from the group consisting of carbon monoxide, synthesis gas, exhausted plasma heated stream or mixtures thereof.

4. The apparatus of claim 1 wherein the comminuted metal oxide is selected from a group consisting of iron oxide, chrome oxide, silicon oxide, manganese oxide, vanadium oxide, nickel oxide, or mixtures thereof.

5. The apparatus of claim 4 wherein the comminuted metal oxide has a particle size in the range from about 10 microns to about 1000 microns.

6. The apparatus of claim 1 wherein the reductant is selected from the group consisting of coke breeze, pulverized coal, peat, fuel oil, natural gas, synthesis gas, propane, butane, or mixtures thereof.

7. The apparatus of claim 1 further comprising prereduction means in communication with the exhaust means for utilizing the exhausted plasma heated stream for the prereduction and preheating of the feed material to be introduced into the reactor means.

8. The apparatus of claim 1 wherein the reactor means further comprises at least one refractory lined tubular water cooled spacer intermediate the reduction chamber and the plasma torch means for providing additional contact time between the plasma heated stream and the feed material prior to entry into the reduction chamber.

9. An apparatus for the direct reduction of a feed material including a reductant, a slag former and a comminuted metal oxide in a plasma heated stream wherein the metal produced forms a metal bath therein, comprising:

enclosed horizontal reactor means having a reduction chamber for containing the metal bath and an adjacent filter chamber being drainable into the reduction chamber, the reduction chamber and filter chamber separated by a common refractory lined passageway with the lower portion of the filter chamber being elevated with respect to the lower portion of the reduction chamber;

non-transferred electric arc plasma torch means for heating a reducing gas to form the plasma heated stream, the plasma torch means positioned proximate the top of the reactor means and in communication with the reduction chamber allowing for the introduction of the plasma heated stream into the reduction chamber such that the plasma heated stream is directed substantially towards the floor of the reduction chamber;

feeding means for introducing the feed material into the plasma heated stream such that the majority of the metal and slag produced separates from the plasma heated stream and collects in the lower portion of the reduction chamber forming the metal bath having a slag layer on the surface thereof with the plasma heated stream impinging on the metal bath thereby heating and mixing the metal bath;

tapping means for the removal of the metal from the metal bath to substantially eliminate overflow of the metal bath into the connecting passageway;

filter means substantially filling the filter chamber for filtering the plasma heated stream, the filter means comprising particulated coke; and exhaust means in communication with the filter chamber for removing the plasma heated stream from the reactor means by drawing the plasma heated stream from the reduction chamber through the refractory line passageway and the filtering means in the filter chamber whereby the filtering means removes substantially all of the molten metal and slag remaining in the plasma heated stream with the recovered metal and slag draining from the filter chamber through the refractory lined passageway into the metal bath for recovery, the passageway substantially preventing the entry of the coke of the filter means into the reduction chamber thereby preventing carbon saturation of the metal bath by the filtering means.

10. The apparatus of claim 9 wherein the feed means includes a carrier gas for transporting and feeding the feed material into the plasma heated stream.

11. The apparatus of claim 10 wherein the carrier gas and the reducing gas are selected from the group consisting of carbon monoxide, synthesis gas, exhausted plasma heated stream or mixtures thereof.

12. The apparatus of claim 9 wherein the comminuted metal oxide is selected from a group consisting of iron oxide, chrome oxide, silicon oxide, manganese oxide, vanadium oxide, nickel oxide, or mixtures thereof.

13. The apparatus of claim 12 wherein the comminuted metal oxide has a particle size in the range from about 10 microns to about 1000 microns.

14. The apparatus of claim 9 wherein the reductant is selected from the group consisting of coke breeze, pulverized coal, peat, fuel oil, natural gas, synthesis gas, propane, butane, or mixtures thereof.

15. The apparatus of claim 9 further comprising prereduction means in communication with the exhaust means for utilizing the exhausted plasma heated stream for the prereduction and preheating of the feed material to be introduced into the reactor means.

16. The apparatus of claim 9 wherein the reactor means further comprises at least one refractory lined tubular water cooled spacer intermediate the reduction chamber and the plasma torch means for providing additional contact time between the plasma heated stream and the feed material prior to entry into the reactor chamber.

17. An apparatus for the direct reduction of a feed material including a reductant, a slag former, and a comminuted metal oxide in a plasma heated stream wherein the metal produced forms a metal bath therein, comprising:

enclosed horizontal reactor means having a reduction chamber for containing the metal bath and an adjacent filter chamber being drainable into the reduction chamber, the reduction chamber and filter chamber separated by a common partition having a plurality of openings therethrough with the lower portion of the partition damming the metal bath;

non-transferred electric arc plasma torch means for heating a reducing gas to form the plasma heated stream, the plasma torch means positioned proximate the top of the reactor means and in communication with the reduction chamber allowing for the introduction of the plasma heated stream into the reduction chamber such that the plasma heated stream is directed substantially towards the floor of the reduction chamber;

feeding means for introducing the feed material into the plasma heated stream such that a majority of the metal and slag produced separates from the plasma heated stream and collects in the lower portion of the reduction chamber forming the metal bath having a slag layer on the surface thereof with the plasma heated stream impinging on the metal bath thereby heating and mixing the metal bath;

tapping means for the removal of the metal from the metal bath to substantially eliminate overflow of the metal bath into the filter chamber via openings in the partition;

filter means substantially filling the filter chamber for filtering the plasma heated stream, the filter means comprising particulated coke; and exhaust means in communication with the filter chamber for removing the plasma heated stream from the reactor means by drawing the plasma heated stream from the reduction chamber through a portion of the openings in the partition and the filtering means in the filter chamber whereby the filtering means removes substantially all of the molten metal and slag remaining in the plasma heated stream with the recovered metal and slag draining from the filter chamber through a portion of the openings in the partition and into the metal bath for recovery, the partition substantially preventing entry of the coke of the filter means into the reduction chamber thereby preventing carbon saturation of the metal bath by the filtering means.

18. The apparatus of claim 17 wherein the feed means includes a carrier gas for transporting and feeding the feed material into the plasma heated stream.

19. The apparatus of claim 18 wherein the carrier gas and the reducing gas are selected from the group consisting of carbon monoxide, synthesis gas, exhausted plasma heated stream or mixtures thereof.

20. The apparatus of claim 17 wherein the comminuted metal oxide is selected from a group consisting of iron oxide, chrome oxide, silicon oxide, manganese oxide, vanadium oxide, nickel oxide, or mixtures thereof.

21. The apparatus of claim 20 wherein the comminuted metal oxide has a particle size in the range from about 10 microns to about 1000 microns.

22. The apparatus of claim 17 wherein the reductant is selected from the group consisting of coke breeze, pulverized coal, peat, fuel oil, natural gas synthesis gas, propane, butane, or mixtures thereof.

23. The apparatus of claim 17 further comprising prereduction means in communication with the exhaust means for utilizing the exhausted plasma heated stream for the prereduction and preheating of the feed material to be introduced into the reactor means.

24. The apparatus of claim 17 wherein the reactor means further comprises at least one refractory lined tubular water cooled spacer intermediate the reduction chamber and the plasma torch means for providing additional contact time between the plasma heated stream and the feed material prior to entry into the reduction chamber.

25. An apparatus for the direct reduction of a feed material including a reductant, a slag former, and a comminuted metal oxide in a plasma heated stream wherein the metal produced forms a metal bath therein, comprising:

enclosed horizontal reactor means having a reduction chamber for containing the metal bath and an adjacent substantially coke-filled filter chamber having a sloped floor draining into the reduction chamber, the reduction chamber and filter chamber separated by a common partition having a plurality of openings therethrough with the lower portion of the partition damming the metal bath;

non-transferred electric arc plasma torch means for heating a reducing gas to form the plasma heated stream, the plasma torch means positioned proximate the top of the reactor means and in communication with the reduction chamber allowing for the introduction of the plasma heated stream into the reduction chamber such that the plasma heated stream is directed substantially towards the floor of the reduction chamber;

feeding means for introducing the feed material into the plasma stream such that substantially all of the metal and slag produced separates from the plasma heated stream and collects in the lower portion of the reduction chamber forming the metal bath having a slag layer on the upper surface thereof with the plasma heated stream impinging upon the upper surface of the metal bath thereby heating and mixing the metal bath;

tapping means for the removal of the metal from the metal bath to eliminate substantial overflow of the metal bath into the filter chamber via openings in the partition; and exhaust means in communication with the filter chamber for removing the plasma heated stream from the reactor means by drawing the plasma heated stream from the reduction chamber through a portion of the openings in the partition and the coke in the filter chamber whereby the coke filters out substantially all of the molten metal and slag remaining in the plasma heated stream with the recovered metal and slag draining onto the sloped floor of the filter chamber through a portion of the openings in the partition and into the metal bath for recovery, the partition substantially preventing the coke from coming in maintained contact with the metal bath with the degree of slope in the floor of the filter chamber being made to control the residence time of the recovered metal in the filter chamber thereby limiting the amount of carbon dissolving therein.

26. The apparatus of claim 25 wherein the feed means includes a carrier gas for transporting and feeding the feed material into the plasma heated stream.

27. The apparatus of claim 26 wherein the carrier gas and the reducing gas are selected from the group consisting of carbon monoxide, synthesis gas, exhausted plasma heated gas or mixtures thereof.

28. The apparatus of claim 25 wherein the comminuted metal oxide is selected from a group consisting of iron oxide, chrome oxide, silicon oxide, manganese oxide, vanadium oxide, nickel oxide, or mixtures thereof.

29. The apparatus of claim 28 wherein the comminuted metal oxide has a particle size in the range from about 10 microns to about 1000 microns.

30. The apparatus of claim 25 wherein the reductant is selected from the group consisting of coke breeze, peat, pulverized coal, fuel oil, natural gas, synthesis gas, propane, butane, or mixtures thereof.

31. The apparatus of claim 25 further comprising prereduction means in communication with the exhaust means for utilizing the exhausted plasma heated stream for the prereduction and preheating of the feed material to be introduced into the reactor means.

32. The apparatus of claim 25 wherein the reactor means further comprises at least one refractory lined tubular water cooled spacer intermediate the reduction chamber and the plasma torch means for providing additional contact time between the plasma heated stream and the feed material prior to entry into the reduction chamber.

33. An apparatus for the direct reduction of a feed material including a reductant, slag formers and a comminuted metal oxide in a plasma heated stream wherein the metal produced forms a metal bath therein, comprising:

enclosed horizontal reactor means having a reduction chamber for containing the metal bath and an adjacent substantially coke-filled filter chamber, the reduction chamber and filter chamber separated by a common partition having a plurality of openings therethrough;

non-transferred electric arc plasma torch means for heating a reducing gas to form the plasma heated stream, the plasma torch means positioned proximate the top of the reactor means and in communication with the reduction chamber allowing for the introduction of the plasma heated stream into the reduction chamber such that the plasma heated stream is directed substantially towards the floor of the reduction chamber;

feeding means for introducing the feed material via a carrier gas into the plasma heated stream such that substantially all of the metal and slag produced separates from the plasma heated stream and collects in the lower portion of the reduction chamber forming the metal bath having a slag layer on the upper surface thereof with the plasma heated stream impinging upon the upper surface of the metal bath thereby heating and mixing the metal bath;

tapping means for the removal of the metal from the metal bath;

exhaust means in communication with the filter chamber for removing the plasma heated stream from the reactor means by drawing the plasma heated stream from the reduction chamber through a portion of the openings in the partition and the coke in the filter chamber whereby the coke filters out substantially all of the molten metal and slag remaining in the plasma heated stream with the recovered metal draining into the metal bath through the partition for recovery, the partition substantially preventing the coke from entering the reduction chamber; and reactor rocker means for the intermittent tilting of the reactor means about a horizontal plane through the reactor such that when the reactor means is tilted in one direction the metal drains from the reduction chamber and flows through the partition into the filter chamber forming the metal bath therein and when the reactor means is tilted in the opposite direction the metal drains from the filter chamber and flows through the partition into the reduction chamber forming the metal bath therein with the direction and period of rotation controlling the residence time of the metal in the filter chamber thereby limiting the amount of coke dissolving therein.

34. The apparatus of claim 33 wherein the feed means includes a carrier gas for transporting and feeding the feed material into the plasma heated stream.

35. The apparatus of claim 34 wherein the carrier gas and the reducing gas are selected from the group consisting of carbon monoxide, synthesis gas, exhausted plasma heated stream or mixtures thereof.

36. The apparatus of claim 33 wherein the comminuted metal oxide is selected from a group consisting of iron oxide, chrome oxide, silicon oxide, manganese oxide, vanadium oxide, nickel oxide, or mixtures thereof.

37. The apparatus of claim 36 wherein the comminuted metal oxide has a particle size in the range from about 10 microns to about 1000 microns.

38. The apparatus of claim 33 wherein the reductant is selected from the group consisting of coke breeze, pulverized coal, peat, fuel oil, natural gas, synthesis gas, propane, butane, or mixtures thereof.

39. The apparatus of claim 33 further comprising prereduction means in communication with the exhaust means for utilizing the exhausted plasma heated stream for the prereduction and preheating of the feed material to be introduced into the reactor means.

40. The apparatus of claim 33 wherein the reactor means further comprises at least one refractory lined tubular water cooled spacer intermediate the reduction chamber and the plasma torch means for providing additional contact time between the plasma heated stream and the feed material prior to entry into the reduction reactor chamber.

41. An apparatus for the direct reduction of a feed material including a reductant, a slag former, and a comminuted metal oxide in a plasma heated stream wherein the metal produced forms a metal bath therein, comprising:

enclosed horizontal reactor means having a reduction chamber for containing the metal bath and an adjacent substantially coke-filled filter chamber having a sloped floor draining into the reduction chamber, the reduction chamber and filter chamber separated by a common partition having a plurality of openings therethrough with the lower portion of the partition damming the metal bath in the reduction chamber;

non-transferred electric arc plasma torch means for heating a reducing gas to form the plasma heated stream, the plasma torch means mounted on the roof of the reactor means and in communication with the reduction chamber allowing for the introducton of the plasma heated stream into the reduction chamber such that the plasma heated stream is directed substantially towards the floor of the reduction chamber;

feeding means for introducing a carrier gas containing the feed material through the roof of the reactor into the plasma heated stream inside the reduction chamber such that substantially all of the metal and slag produced separates from the plasma heated stream and collects in the lower portion of the reduction chamber forming the metal bath having a slag layer on the upper surface thereof with the plasma heated stream impinging upon the upper surface of the metal bath thereby heating and mixing the metal bath;

tapping means for the removal of the metal from the metal bath to eliminate substantial overflow of the metal bath into the filter chamber via openings in the partition; and exhaust means in communication with the filter chamber for removing the plasma heated stream from the reactor means by drawing the plasma heated stream from the reduction chamber through a portion of the openings in the partition and the coke in the filter chamber whereby the coke filters out substantially all of the molten metal and slag remaining in the plasma heated stream with the recovered metal and slag draining onto the sloped floor of the filter chamber through a portion of the openings in the partition and into the metal bath for recovery, the partition substantially preventing the coke in the filter chamber from coming in contact with the metal bath with the degree of slope in the floor of the filter chamber being made to control the residence time of the recovered metal in the filter chamber thereby limiting the amount of coke dissolving therein.

42. The apparatus of claim 41 wherein the feed means includes a carrier gas for transporting and feeding the feed material into the plasma heated stream.

43. The apparatus of claim 42 wherein the carrier gas and the reducing gas are selected from the group consisting of carbon monoxide, synthesis gas, exhausted plasma heated streams or mixtures thereof.

44. The apparatus of claim 41 wherein the comminuted metal oxide is selected from a group consisting of iron oxide, chrome oxide, silicon oxide, manganese oxide, vanadium oxide, nickel oxide, or mixtures thereof.

45. The apparatus of claim 44 wherein the comminuted metal oxide has a particle size in the range from about 10 microns to about 1000 microns.

46. The apparatus of claim 41 wherein the reductant is selected from the group consisting of coke breeze, pulverized coal, peat, fuel oil, natural gas, synthesis gas, propane, butane, or mixtures thereof.

47. The apparatus of claim 41 further comprising prereduction means in communication with the exhaust means for utilizing the exhausted plasma heated stream for the prereduction and preheating of the feed material to be introduced into the reactor means.

48. The apparatus of claim 41 wherein the reactor means further comprises at least one refractory lined tubular water cooled spacer intermediate the reduction chamber and the plasma torch means for providing additional contact time between the plasma heated stream and the feed material prior to entry into the reduction chamber.

49. A process for the direct reduction of a feed material including a reductant, a slag former, and a comminuted metal oxide in a plasma heated stream in an apparatus comprising an enclosed horizontal reactor having a reduction chamber for containing a metal bath and an adjacent substantially coke-filled filter chamber having a sloped floor draining into the reduction chamber with an electric arc plasma torch mounted proximate the roof the reduction chamber, comprising:

heating a reducing gas with the electric arc plasma torch to form a plasma heated stream having a temperature in excess of the melting point of the metal to be collected;

injecting the plasma heated stream into the reduction chamber;

injecting the feed material into the plasma heated stream so that substantially complete reduction of the metal oxide and melting of the metal so formed occurs;

collecting the molten metal at the bottom of the reduction chamber, the collected metal forming a metal bath having a layer of slag on the surface thereof;

providing unreduced metal oxide in the slag to maintain the ratio between the metal oxide and the reductant in the reduction chamber at substantially stoichiometric value;

separating the substantially coke-filled filter chamber from the reduction to substantially prevent the entry of the coke into the reduction chamber;

exhausting the plasma heated stream from the reactor by drawing the plasma heated stream from the reduction chamber and into and through the filter chamber wherein the coke filters out substantially all of the metal and slag entrained in the plasma heated stream for recovery; and draining the recovered metal and slag from the sloped floor of the filter chamber into the reduction chamber with the degree of slope in the floor of the filter chamber controlling the residence time of the recovered metal with the coke in the filter chamber.

50. The process described in claim 49 wherein the feed material is injected into the reduction chamber with a carrier gas with the weight ratio of the feed material to carrier gas being equal to greater than 10 to 1.

51. The process of claim 50 wherein the carrier gas is selected from the group consisting of carbon monoxide, synthesis gas, exhausted plasma heated steam, or mixtures thereof.

52. The process of claim 49 wherein the comminuted metal oxide is selected from a group consisting of iron oxide, chrome oxide, silicon oxide, manganese oxide, vanadium oxide, nickel oxide, or mixtures thereof.

53. The process of claim 52 wherein the comminuted metal oxide has a particle size in the range from about 10 microns to about 1000 microns.

54. The process of claim 49 wherein the reductant is selected from the group consisting of coke breeze, pulverized coal, peat, fuel oil, natural gas, synthesis gas, propane, butane, or mixtures thereof.

55. The process of claim 49 further comprising prereducing and preheating the feed material with the exhausted plasma heated stream.

56. The process of claim 49 further comprising passing the plasma heated stream and the feed material through a refractory lined, tubular, water-cooled spacer positioned intermediate the plasma torch and the reduction chamber thereby increasing the contact time between the plasma heated stream and the feed material prior to their entry into the reduction chamber.

57. The process of claim 49 wherein the reducing gas is selected from the group consisting of carbon monoxide, synthesis gas, exhausted plasma heated stream, or mixtures thereof.

* * * * *